United States Patent [19]

Russell

[11] Patent Number: 4,593,505
[45] Date of Patent: Jun. 10, 1986

[54] PANEL BASE ELECTRICAL RACEWAY
[75] Inventor: Robert L. Russell, Kentwood, Mich.
[73] Assignee: Westinghouse Electric Corp., Pittsburgh, Pa.
[21] Appl. No.: 618,603
[22] Filed: Jun. 8, 1984
[51] Int. Cl.⁴ .................................................. E04B 5/48
[52] U.S. Cl. ........................................ 52/221; 52/242; 52/287; 174/49
[58] Field of Search .............. 52/220, 221, 241, 242, 52/287, 290; 339/22 R, 20, 23; 174/48, 49

[56]       References Cited
           U.S. PATENT DOCUMENTS

| | | | |
|---|---|---|---|
| 1,718,253 | 6/1929 | Putnam | 174/49 X |
| 2,730,209 | 1/1956 | Larsen | 52/290 X |
| 4,133,153 | 1/1979 | Hage | 52/220 |
| 4,278,834 | 7/1981 | Boundy | 174/48 |
| 4,406,101 | 9/1983 | Heidmann | 52/220 |

*Primary Examiner*—Carl D. Friedman
*Assistant Examiner*—Naoko N. Slack
*Attorney, Agent, or Firm*—B. R. Studebaker

[57]           ABSTRACT

An electrical raceway for the base of a space dividing wall panel system which is suspended beneath the wall panel and includes an upper area surrounded by base covers for carrying the electrical circuits and a lower area defined by a flexible boot for carrying telephone circuits and the like. Access to the lower area is open but has the appearance of being closed from normal viewing angles.

8 Claims, 3 Drawing Figures

PANEL BASE ELECTRICAL RACEWAY

CROSS REFERENCE TO RELATED APPLICATIONS

This application is related to application Ser. No. 618,629 filed June 8, 1984 by B. L. Boundy, et al. for TERMINAL BLOCK MOUNT.

BACKGROUND OF THE INVENTION

This invention relates to electrical raceways for space dividing wall panel systems of the type disclosed in U.S. Pat. No. 4,278,834 for Versatile Electrified Space Dividing Wall Panel System in which the space dividing wall panels are supported and connected by cylindrical support posts adjacent each end of the panels and in which the electrical raceway is suspended beneath the wall panel above the floor.

With the increased use of task lighting, business machines, personal computers and the like in the office environment, almost all space dividing wall panel systems for open office use require the inclusion of an electrical distribution system and must also provide space for, in addition to electrical power lines, communication lines such as telephone cables. Although the aforementioned U.S. Pat. No. 4,278,834 does not include a provision for communication cables in addition to the electrical power lines other electrical raceway systems, such as for example U.S. Pat. No. 4,406,101 for Partition Wireway With Flexible Sides, do make provisions for the addition of telephone cables and the like in a separate and distinct compartment from the power lines.

As in any modern product there is the necessity to reduce manufacturing costs, installation costs and have the product be exceptionally utilitarian from the standpoint of the ultimate user. With the advent of self-protected power cable systems the need for separate and distinct enclosed structures for isolating the power cables from the communication cables has been eliminated thus permitting more accessible designs for power and communication raceways.

SUMMARY OF THE INVENTION

In accordance with the present invention an improved power and communication raceway for a space dividing wall panel system is provided in which at least a pair of spaced frame members are secured to the bottom of the wall panel each having an electrical component receiving aperture therein and cover retaining members extending laterally therefrom. An elongated, inverted T-shaped member interconnects the bottom edges of the spaced frame members and base covers are releasably secured to the cover retaining members on the frame members on each side of the panel. An elongated flexible boot having a base portion and an upwardly directed flange portion on each side edge of the base portion is secured to the horizontal portion of the inverted T-shaped member with the upper edges of the upwardly directed flange portions terminating substantially below and inwardly of the bottom edge of the base covers to provide easy access to the cavity defined by the flexible boot and give the wall panel an appearance of floating above the boot. The raceway further includes electrical component retaining detents which extend inwardly from the top and bottom edges of the electrical component receiving aperture in the frame members. The elongated flexible boot is substantially U-shaped in cross section and includes inwardly directed tab members which slidably receive the horizontal flange of the inverted T-shaped member. The base covers include inwardly directed top and bottom flange members which coact with the cover retaining members to releasably retain the base covers on the frame members, the base covers further include convenience outlet receiving apertures therethrough, adjacent the frame members.

BRIEF DESCRIPTION OF THE DRAWINGS

Many of the attendant advantages of the present invention will become more readily apparent and better understood as the following detailed description is considered in connection with the accompanying drawings in which.

DESCRIPTION OF THE PREFERRED EMBODIMENT

Figure 1:
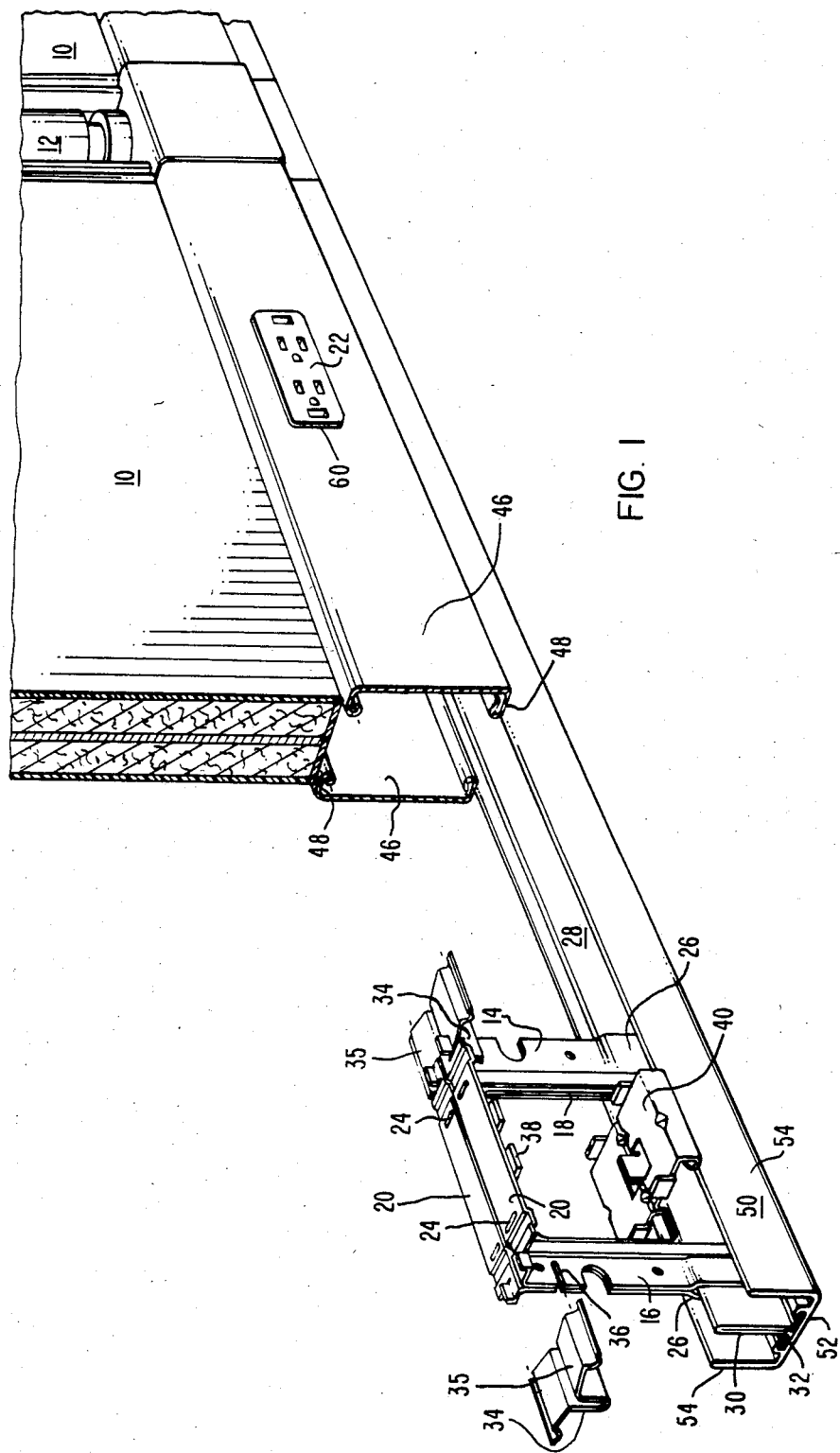
FIG. 1 is a perspective view of the electrical raceway of this invention with a portion of the space dividing wall panel removed.
Figure 2:
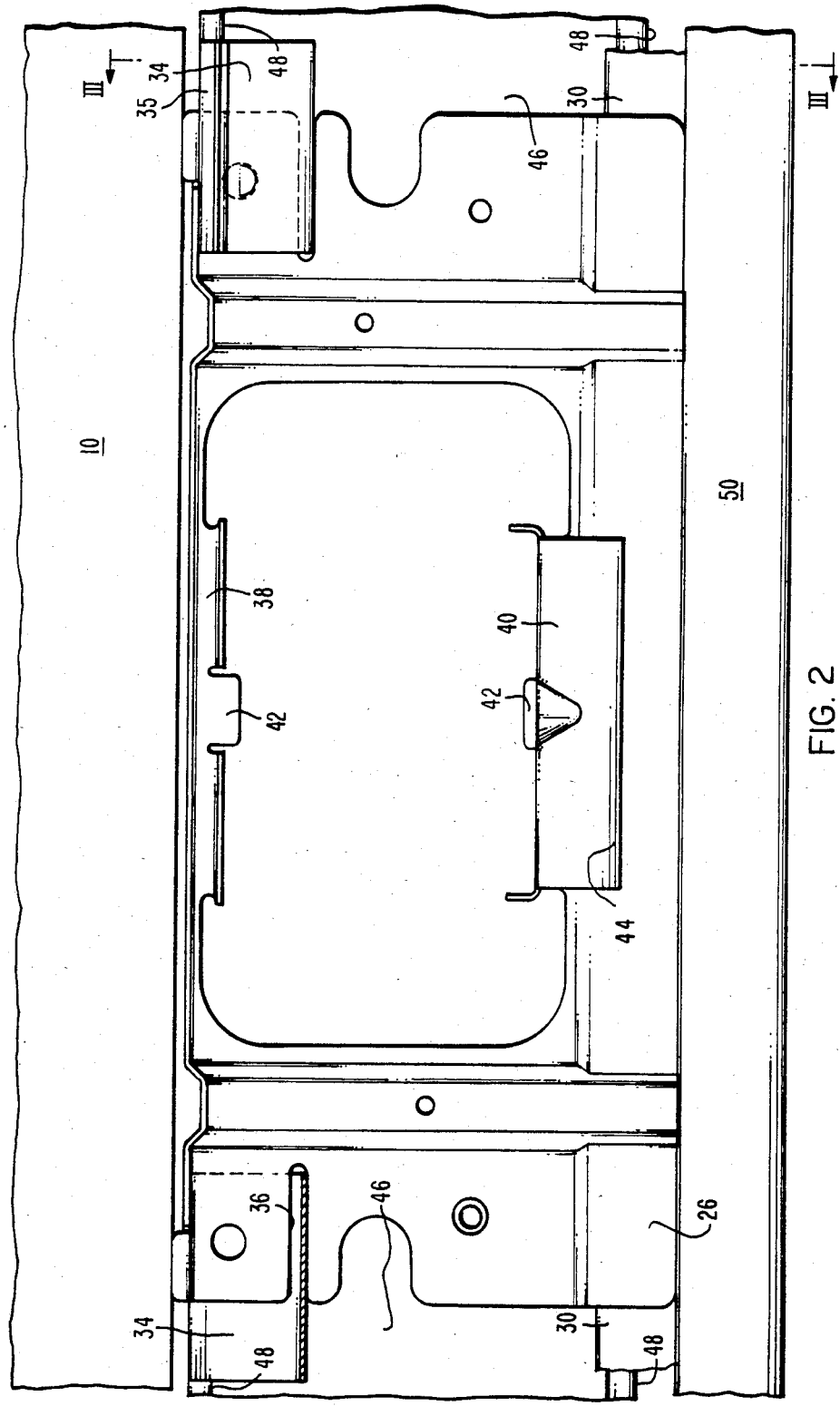
FIG. 2 is a side elevation view of the raceway of this invention with one of the covers removed.
Figure 3:
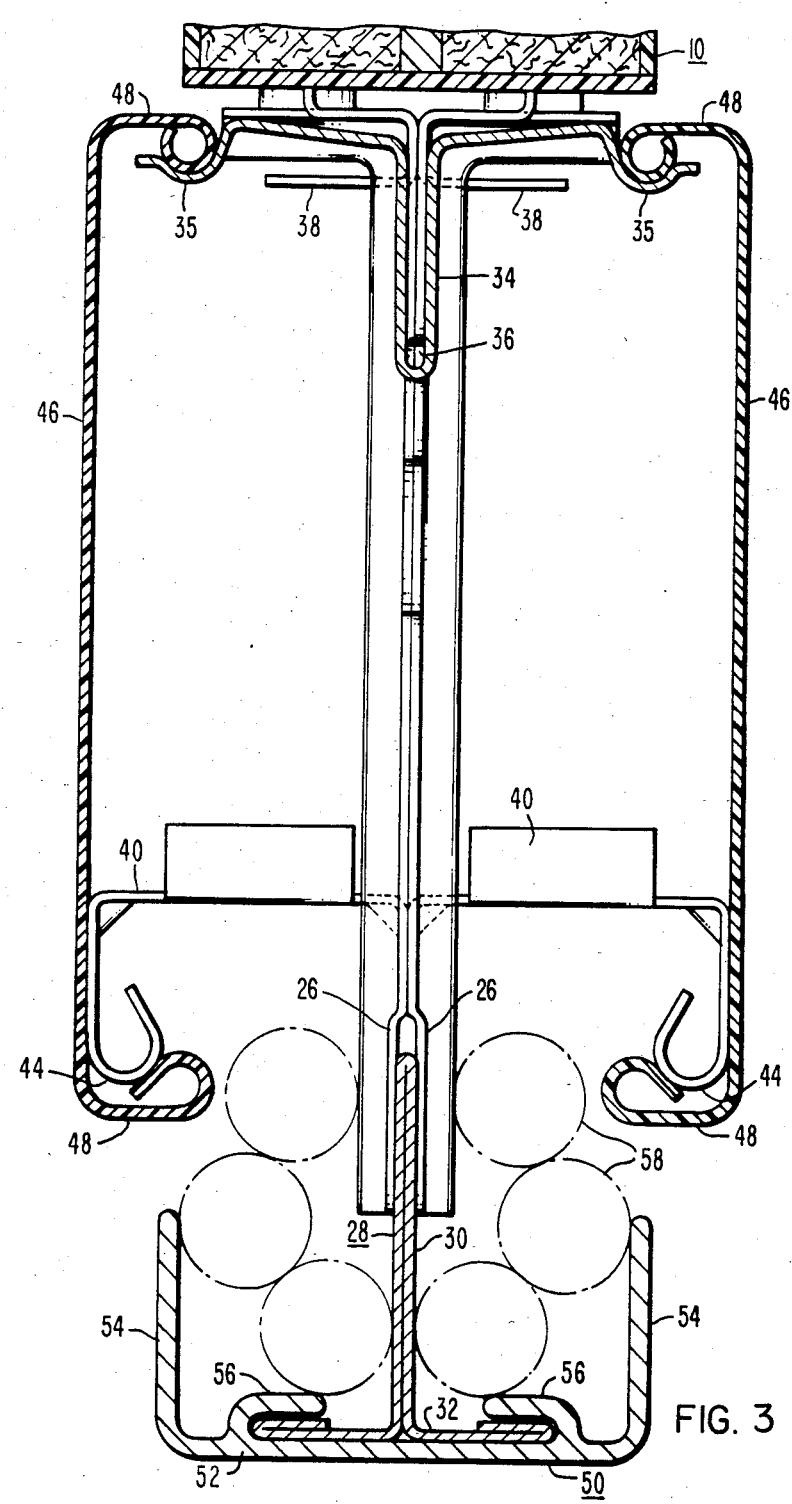
FIG. 3 is a sectional view taken along the line III—III of FIG. 2 with both of the covers in place.

Referring now in detail to the drawings wherein like reference characters represent like parts throughout the several views there is illustrated in FIG. 1 a typical space dividing wall panel 10 of the type which is supported at each end by a cylindrical support post 12. This type of space dividing wall panel system is described in detail in U.S. Pat. No. 3,762,116 for Space Divider System And Connector Assembly Therefore. The power and communication raceway of the present invention is suspended beneath the wall panel 10 and includes a pair of spaced frame members 14 including a body portion 16 having an electrical component receiving aperture 18 therein and a pair of top flanges 20 which facilitate the securing of the frame members 14 to the underside of the wall panel 10. As illustrated in FIG. 1 the second of the pair of frame members 14 is not shown but is situated adjacent the convenience outlet 22. As will be apparent, for longer panels, more than two spaced frame members can be included where it is desired to have more than two electrical convenience outlets on one or both sides of the wall panel.

The top flanges 20 include several elongated slots 24 therethrough which facilitate the securing of the frame members 14 to the underside of the wall panel as for example by screws or bolts. The frame members 14 are constructed from a pair of identical sheet steel members which are welded together back to back by a plurality of spot welds to provide a pair of spaced parallel leg portions 26. Secured in the space between the leg portions 26 is an elongated inverted T-shaped rail member including a vertical portion 30 and a horizontal portion 32. The elongated inverted T-shaped rail member 28 interconnects the pair of spaced frame members 14 and is preferably welded in the slot between the leg members 26.

A spring retaining clip 34 including wing portions 35 is mounted to each side of the frame member 14 in slots 36 adjacent the top thereof. An upper 38 and lower 40 electrical component retaining brackets are integral with the frame member and serve to mount an electrical component or terminal block within the electrical component mounting aperture 18. Each includes inwardly directed mounting detents 42 which serve to mount an electrical terminal block within the frame member 14 in a manner which is described in detail in copending application Ser. No. 618,629 filed June 8, 1984 for TERMINAL BLOCK MOUNT. Included on the lower terminal block mounting member 40 is a downwardly directed rolled flange 44 which in combination with the wing portions 35 of the upper mounting clips 34 serve to retain in place base cover members 46 which are releasably retained thereon by upper and lower inwardly directed top and bottom flange members 48.

A pair of spaced compartments are provided along the underside of the power distribution raceway for receiving communication cables and the like in the form of a flexible U-shaped boot 50. The flexible boot 50 includes a base portion 52 and a pair of flexible upwardly directed side portions 54 and a pair of inwardly directed tabs 56 which serve to retain the flexible boot on the horizontal portion of the inverted T-shaped rail member 30. The upwardly directed side portions 54 of the boot 50 terminate substantially inwardly of and below the base covers 46 providing ready access to the interior of the cavity defined by the flexible boot while giving the appearance, from normal viewing angles, that no opening is present between the two parts and further providing the esthetic appearance that the wall panel and base cover members float above the floor.

The two sides of the frame member 14 along with the rail member 30 and the base covers 46 are preferably constructed of a 20 gage cold rolled steel and the flexible boot member 50 is preferably extruded PVC to provide for flexibility of the upwardly directed side members 54. The base covers 46 may be provided with aperture 60 therethrough adjacent each of the frame members 14 in order to provide electrical convenience outlets 22 in connection with a terminal block mounted in the electrical component receiving aperture 18.

As will be apparent from the foregoing the electrical and communications raceway of the present invention provides a light weight addition to the panel by means of the spaced frame members 14 as opposed to a more massive continuous frame structure and provides easy and separate access to the communications cable carrying area separate from the power compartment area to facilitate the changing of communication wires without requiring the services of an electrician to provide access to the power compartment of the combined raceway. It will be further apparent that the base covers 46 may merely be snapped on and off of the retaining members 44 and 35 to further provide easy access to the area of the raceway containing the power cables.

What is claimed is:

1. An electrical raceway for a space dividing wall panel system, said electrical raceway comprising:
    at least a pair of spaced frame members constructed and arranged to be secured to the bottom of a wall panel said spaced frame members having an electrical component receiving aperture therein, and cover retaining members extending laterally therefrom;
    an elongated inverted T-shaped member interconnecting said spaced frame members;
    a base cover releasably secured to said cover retaining members on each side of said frame members; and
    an elongated flexible boot having a base portion and an upwardly directed side portion, terminating in an upper edge, on each side edge of said base portion, said elongated flexible boot secured to the horizontal portion of said inverted T-shaped member with the upper edges of said upwardly directed flange portions terminating substantially below and inward of the bottom edge of said base covers.

2. The electrical raceway according to claim 1 wherein electrical component retaining detents extend inwardly from opposed edges of said electrical component receiving aperture.

3. The electrical raceway according to claim 1 wherein said elongated flexible boot is substantially U-shaped in cross section and includes inwardly directed tab members which slidably receive the horizontal portion of said inverted T-shaped member.

4. The electrical raceway according to claim 1 wherein said base covers include inwardly directed top and bottom flange members which coact with said cover retaining members to releasably retain said base covers on said frame members, said base covers further including convenience outlet receiving apertures therethrough adjacent said frame members.

5. An electrical raceway for a space dividing wall panel system of the type employing intermediate support posts for supporting adjacent space dividing wall panels, said electrical raceway comprising:
    spaced frame means suspended from the bottom edge of a space dividing wall panel, said frame means including base cover retaining means extending laterally therefrom;
    an elongated rail means interconnecting said spaced frame means having laterally extending flanges on each side thereof;
    base covers releasably secured to said base cover retaining means on each side of said frame means and extending for the length of the wall panel; and
    a substantially U-shaped flexible boot, having upwardly directed portions, secured to the laterally extending flanges of said rail means with the ends of the upwardly directed portions of said U-shaped flexible boot terminating substantially below and inwardly of the bottom edge of said base covers.

6. The electrical raceway according to claim 5 wherein said frame means includes an electrical component receiving aperture therein and electrical component retaining detents extending inwardly from opposite edges of said electrical component receiving aperture.

7. The electrical raceway according to claim 5 wherein said substantially U-shaped flexible boot includes inwardly directed tab members which slidably receive the laterally extending flanges on said elongated rail means.

8. The electrical raceway according to claim 5 wherein said base covers include inwardly directed top and bottom flange members which coact with said base cover retaining means to releasably retain said base cover on said frame members, said base covers further including convenience outlet receiving apertures therethrough adjacent said frame means.

* * * * *